US006970255B1

(12) United States Patent
Spady et al.

(10) Patent No.: US 6,970,255 B1
(45) Date of Patent: Nov. 29, 2005

(54) ENCODER MEASUREMENT BASED ON LAYER THICKNESS

(75) Inventors: Blaine R. Spady, Lincoln, NE (US); John D. Heaton, Fremont, CA (US); Weidong Yang, Milpitas, CA (US); Roger R. Lowe-Webb, Sunnyvale, CA (US)

(73) Assignee: Nanometrics Incorporated, Milpitas, CA (US)

( * ) Notice: Subject to any disclaimer, the term of this patent is extended or adjusted under 35 U.S.C. 154(b) by 366 days.

(21) Appl. No.: 10/422,232

(22) Filed: Apr. 23, 2003

(51) Int. Cl.[7] .......................... G01B 11/14; G01D 5/34
(52) U.S. Cl. .............. 356/616; 250/231.13; 250/237 G
(58) Field of Search .............................. 356/614–623, 356/630–632; 250/231.13, 231.14, 231.16, 250/237 G

(56) References Cited

U.S. PATENT DOCUMENTS

| | | | | |
|---|---|---|---|---|
| 4,355,903 A | * | 10/1982 | Sandercock ................. | 356/632 |
| 5,214,492 A | | 5/1993 | LoBianco et al. ........... | 356/400 |
| 5,216,257 A | | 6/1993 | Brueck et al. .............. | 250/548 |
| 5,241,366 A | * | 8/1993 | Bevis et al. ................ | 356/632 |
| 5,307,152 A | | 4/1994 | Boehnlein et al. .......... | 356/376 |
| 5,499,096 A | * | 3/1996 | Tamiya ....................... | 356/494 |
| 5,559,601 A | | 9/1996 | Gallatin et al. ............. | 356/363 |
| 5,805,290 A | | 9/1998 | Ausschnitt et al. ......... | 356/401 |
| 5,969,819 A | | 10/1999 | Wang .......................... | 356/371 |
| 6,077,756 A | | 6/2000 | Lin et al. .................... | 438/401 |
| 6,084,712 A | | 7/2000 | Harding ...................... | 359/618 |
| 6,130,750 A | | 10/2000 | Ausschnitt et al. ......... | 356/401 |
| 6,313,460 B1 | | 11/2001 | Haas et al. ............. | 250/231.13 |
| 6,350,984 B1 | | 2/2002 | Senda ................... | 250/231.13 |
| 6,407,396 B1 | | 6/2002 | Mih et al. ................ | 250/491.1 |
| 6,429,930 B1 | | 8/2002 | Littaue et al. .............. | 356/124 |
| 6,458,605 B1 | | 10/2002 | Stirton .......................... | 438/7 |
| 2002/0135875 A1 | | 9/2002 | Niu et al. .................... | 359/564 |
| 2002/0158193 A1 | | 10/2002 | Sezginer et al. ............ | 250/237 |
| 2003/0002043 A1 | | 1/2003 | Abdulhalim et al. ....... | 356/400 |
| 2003/0042579 A1 | | 3/2003 | Schulz ........................ | 257/629 |
| 2003/0043372 A1 | | 3/2003 | Schulz ........................ | 356/327 |
| 2003/0043375 A1 | | 3/2003 | Opsal .......................... | 356/369 |
| 2003/0044702 A1 | | 3/2003 | Schulz .......................... | 430/30 |
| 2003/0160163 A1 | | 8/2003 | Wong et al. ................. | 250/237 |
| 2003/0169423 A1 | | 9/2003 | Finarov et al. ............. | 250/237 |
| 2003/0223630 A1 | | 12/2003 | Adel et al. .................. | 382/145 |
| 2004/0101983 A1 | | 5/2004 | Jones et al. .................. | 438/14 |

FOREIGN PATENT DOCUMENTS

| | | | |
|---|---|---|---|
| JP | 1-295116 | * 11/1989 | |
| JP | 2003-247864 | * 9/2003 | |
| WO | WO 01/84382 A1 | 11/2001 | ........... G06F 17/50 |

(Continued)

OTHER PUBLICATIONS

D.C. Flanders & Henry I. Smith, A new interferometric alignment technique[a)], Applied Physics Letters, vol. 31, No. 7, Oct. 1, 1977, pp. 426-428.

(Continued)

Primary Examiner—Hoa Q. Pham
(74) Attorney, Agent, or Firm—Silicon Valley Patent Group LLP

(57) ABSTRACT

An encoder includes a layer on the scale that has a thickness that varies as a function of position along the length of the scale. The position of the sensor head with respect to the scale may be determined by measuring the thickness of the layer or index of refraction, e.g., using a reflectometer, and converting the thickness to the lateral position. In one embodiment, the thickness of the layer is used to provide a rough position of the sensor head with respect to the scale and an alignment target that includes periodic patterns on both the sensor head and scale is used to provide a refined position.

22 Claims, 11 Drawing Sheets

FOREIGN PATENT DOCUMENTS

| WO | WO 02/25723 A2 | 3/2002 | H01L 21/66 |
| WO | WO 02/065545 A2 | 8/2002 | H01L 21/66 |
| WO | WO 02/069390 A2 | 9/2002 | H01L 21/66 |
| WO | WO 02/084213 A1 | 10/2002 | G01B 11/00 |
| WO | WO 03/071471 A1 | 8/2003 | G06K 9/00 |

OTHER PUBLICATIONS

Bischoff, J. et al., "Light Diffraction Based Overlay Measurement" *Proceedings of SPIE*, vol. 4344 (2001) pp. 222-233.

Michaelis, A. et al., "Spectroscopic Anistropy Micro-Ellipsometry (SAME) for determiation of lateral and vertical dimensions of sub-micron lithographic structures" IEEE Catalog No. 99TH8453 (1999) pp. 131-134.

NanoWave:Technology/development tools, http://www.nanowave.com/technology_applications/tech_devtoolsPR.html, 2 pages, downloaded Apr. 9, 2002.

NanoWave:Technology/how it works, http://www.nanowave.com/technology_applications/tech_HIWPR.html, 3 pages, downloaded Apr. 9, 2002.

NanoWave:Technology/product design, http://www.nanowave.com/technology_applications/tech_designPR.html, 4 pages, downloaded Apr. 9, 2002.

* cited by examiner

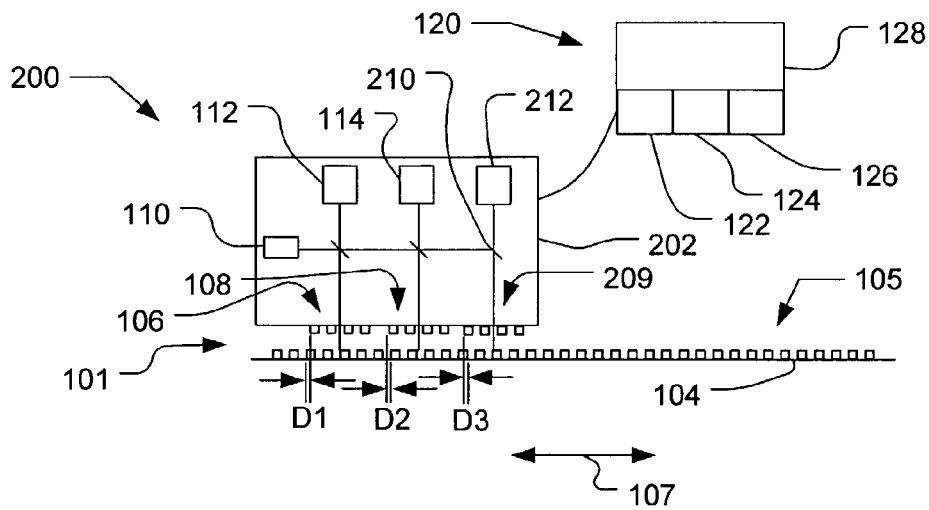
Fig. 10
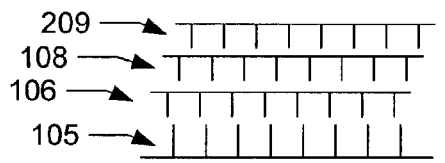
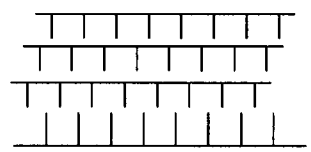
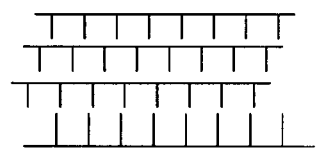
Fig. 11A          Fig. 11B          Fig. 11C
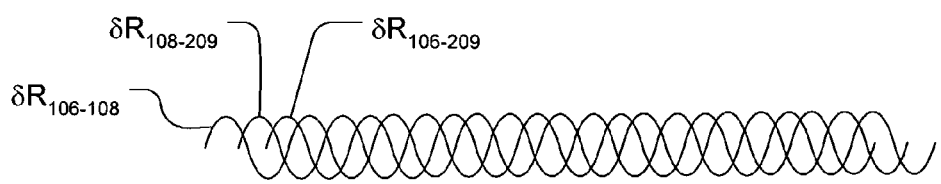
Fig. 12

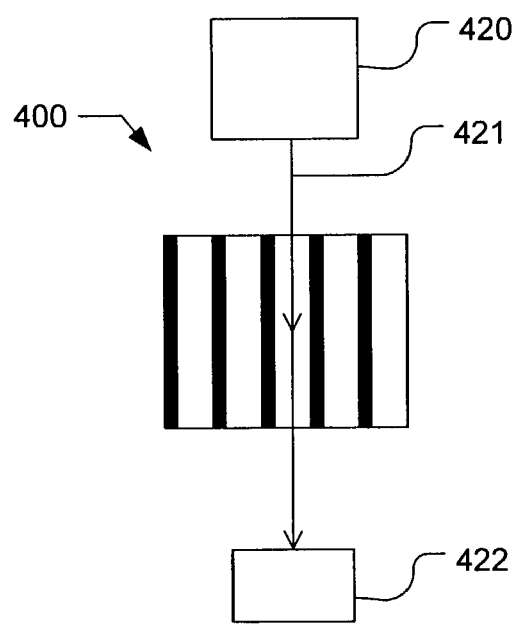
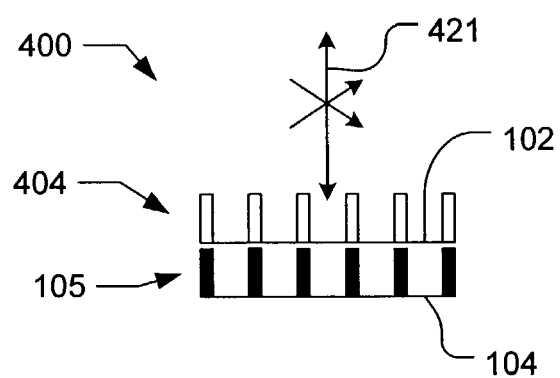
Fig. 14A        Fig. 14B
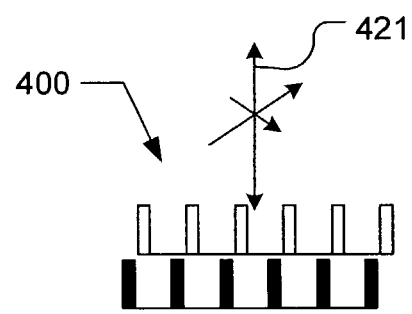
Fig. 15

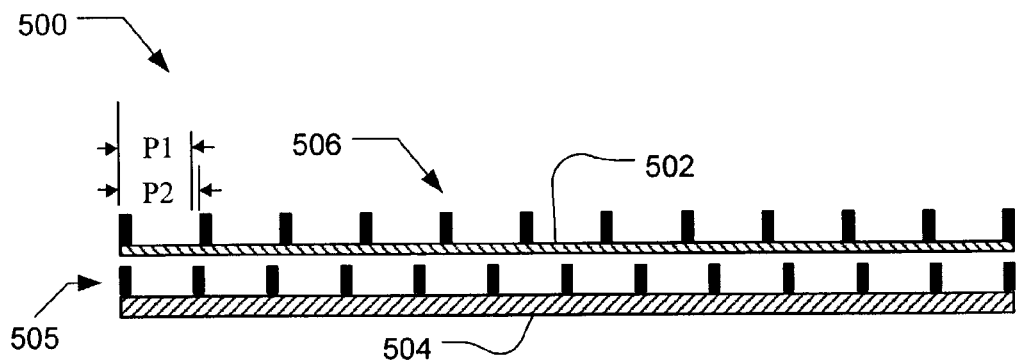
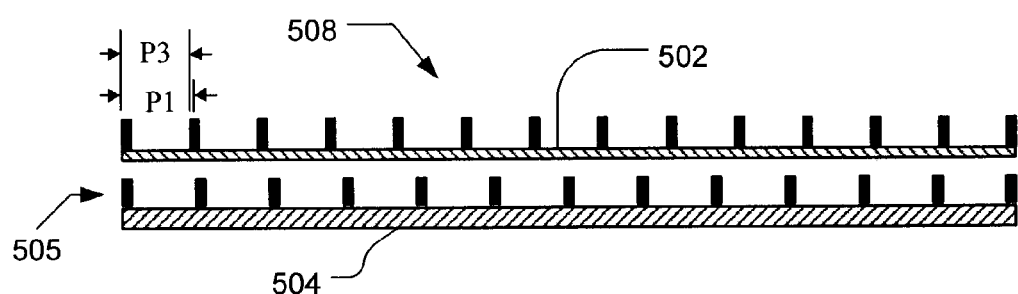
Fig. 17
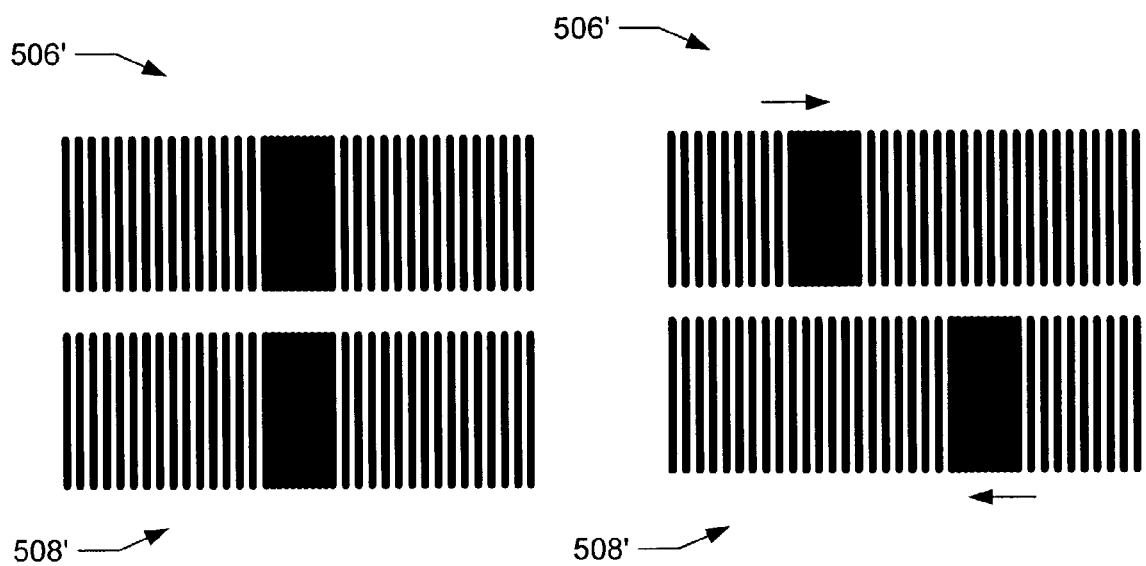
Fig. 18A  Fig. 18B

ENCODER MEASUREMENT BASED ON LAYER THICKNESS

BACKGROUND OF THE INVENTION

1. Field of the Invention

The present invention relates to a position measurement device, and in particular to an encoder that includes an alignment target having a designed in offset between periodic patterns.

2. Discussion of the Related Art

Position measurement devices, such as optical encoders, are well known in the art. FIG. 1 shows a conventional optical encoder 10 that includes a light source 12, which produces a light beam 13. The light beam 13 passes through a grid plate 14 that includes a number of regular opaque and transparent regions 16. After passing through the grid plate 14, the light beam 13 is received by a detector 18. As the grid plate 14 moves relative to the light source 12 and detector 18, as indicated by the arrows in FIG. 1, the light beam 13 will pass through only the transparent regions 16 on grid plate, creating pulses of light at the detector 18. The detector 18 converts the pulses of light into a periodic electronic signal. By counting the pulses from the detector 18, and knowing the length of each transparent and opaque region, the position of the grid plate 14 relative to the light source 12 and detector 18 can be determined.

Encoder 10 is a relatively inexpensive device, but unfortunately, the accuracy of the device is limited. Techniques such as interpolation may be used to improve the accuracy, but even with interpolation the accuracy is limited to approximately 20 nm. Another type of encoder that is used to provide an accurate position measurement is a differential interferometer.

FIG. 2 shows a conventional differential interferometer alignment system 50 that may be used as an encoder. Alignment system 50 includes a light source 52 that produces monochromatic light. Typically, the monochromatic light is collimated. A beam splitter 54 splits the light to be reflected off a stationary mirror 56 and a mirror 58, which is movable, as indicated by the arrows in FIG. 2. Mirror 58 is typically mounted on a movable object, e.g., a stage. The light is reflected off mirrors 56 and 58 and is recombined at beam splitter 54. The combined light is focused by a lens 60 onto a detector 62. The operation of a differential interferometer is well known. Advantageously, alignment system 50 provides an accuracy of approximately 10 nm, but typically has increased cost relative to a simpler encoder, such as that shown in FIG. 1.

Thus, there is a need for an inexpensive but highly accurate encoder.

SUMMARY

An encoder, in accordance with the present invention includes a layer on the scale that has a thickness that varies as a function of position along the length of the scale. The position of the sensor head with respect to the scale may be determined by measuring the thickness or index of refraction of the layer, e.g., using a reflectometer, and converting the thickness to the lateral position. In one embodiment, the measurement is used to provide a rough position of the sensor head with respect to the scale and an alignment target that includes periodic patterns on both the sensor head and scale is used to provide a refined position.

In one embodiment of the present invention, a method of determining the position of a first element with respect to a second element along a direction of motion includes providing a layer on the second element where the layer varies in one of thickness and index of refraction along the direction of motion. The method includes measuring one of thickness and index of refraction of the layer with a sensor on the first element and converting the measurement of the layer to the position of the first element with respect to the second element. In one embodiment, the method further includes providing an alignment target on the first element and the second element where the alignment target has at least one periodic pattern on the first element and at least one periodic pattern on the second element. The method includes moving at least one of the first element and the second element with respect to the other, illuminating the alignment target with incident radiation. The radiation is detected after interacting with the periodic pattern and using that detected radiation the position of the first element with respect to the second element is determined.

In another embodiment, an apparatus for determining the position of a sensor head with respect to a scale includes a layer on the scale extending in a first direction, the layer having one of thickness and index of refraction that varies as a function of position in the first direction. The apparatus includes at least one light source for producing light to be incident on the layer and a light a light detector for detecting light that interacts with the layer. A processor that is coupled to the light detector includes a computer-usable medium having computer-readable program code embodied therein for causing the processor to calculate one of thickness and index of refraction of the layer based on the light detected by the light detector, the computer-readable program code embodied therein causing the to convert one of thickness and index of refraction to a position in the first direction. The apparatus may include, e.g., additional elements, such as an alignment target on the sensor head and the scale, the alignment target having at least one periodic pattern on the sensor head and at least one periodic pattern on the scale. The alignment target may be used to provide a refine position, while the one of thickness and index of refraction of the layer provides an approximate or rough position.

BRIEF DESCRIPTION OF THE DRAWINGS

FIG. 10 shows another embodiment of an encoder in accordance with the present invention.

FIGS. 11A, 11B, and 11C illustrate schematically the operation of the encoder of FIG. 10.

FIG. 12 illustrates periodic patterns that will be formed by the difference in spectral reflectance in the encoder of FIG. 10.

FIGS. 14A and 14B and 15 show a top view and side views, respectively, of an alignment target with which multiple polarization states are used.

FIG. 17 shows an embodiment of an alignment target that may be used with the encoder.

FIGS. 18A and 18B shows moiré fringe patterns produced by the alignment target shown in FIG. 17.

DETAILED DESCRIPTION

In accordance with an embodiment of the present invention, an encoder uses an alignment target that includes periodic patterns on the movable element and the stationary element. The alignment target may include at least two measurement locations, each location having a different offset between the periodic pattern on the movable element with respect to the periodic pattern on the stationary element. Alternatively, two measurements using different polarization states may be made at one location. When the periodic patterns on the movable element and the stationary element are aligned, the difference between the two measurements will produce a minima, i.e., approximately a zero value plus noise. By counting the minima, the precise position of the movable element with respect to the stationary element can be determined.

The present invention may be used to determine the position of one element with respect to another with a fraction of a nanometer accuracy. Thus, the present invention provides a large improvement compared to current technology.

The alignment target used in accordance with the present invention is similar to that described in detail in U.S. patent application entitled "Alignment Target with Designed in Offset" by Weidong Yang, Roger R. Lowe-Webb, John D. Heaton, and Guoguang Li, Ser. No. 10/116,863; U.S. patent application Entitled "Positioning Two Elements Using An Alignment Target with a Designed in Offset" by Weidong Yang, Roger R. Lowe-Webb, Ser. No. 10/116,964; U.S. patent application entitled "Measuring An Alignment Target With Multiple Polarization States" by Weidong Yang, Roger R. Lowe-Webb, Ser. No. 10/116,798, and in U.S. patent application entitled "Encoder with An Alignment Target" by John D. Heaton, Weidong Yang, and Roger R. Lowe-Webb, Ser. No. 10/116,863, all of which were filed on Apr. 4, 2002 and have the same assignee as the present application and all of which are incorporated herein by reference.

Figure 1:
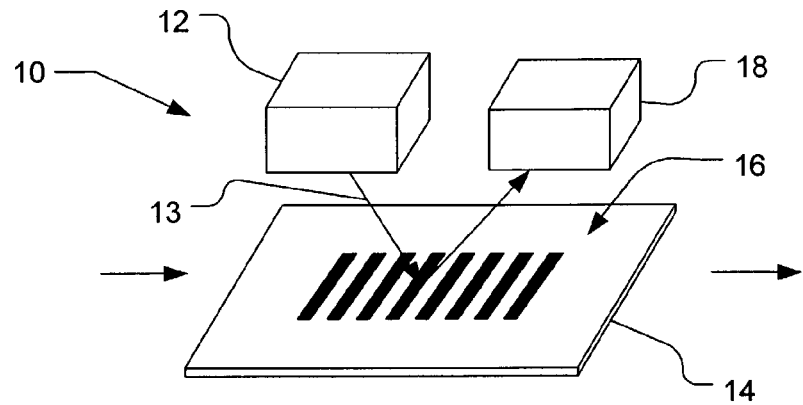
FIG. 1 shows a conventional encoder.
Figure 2:
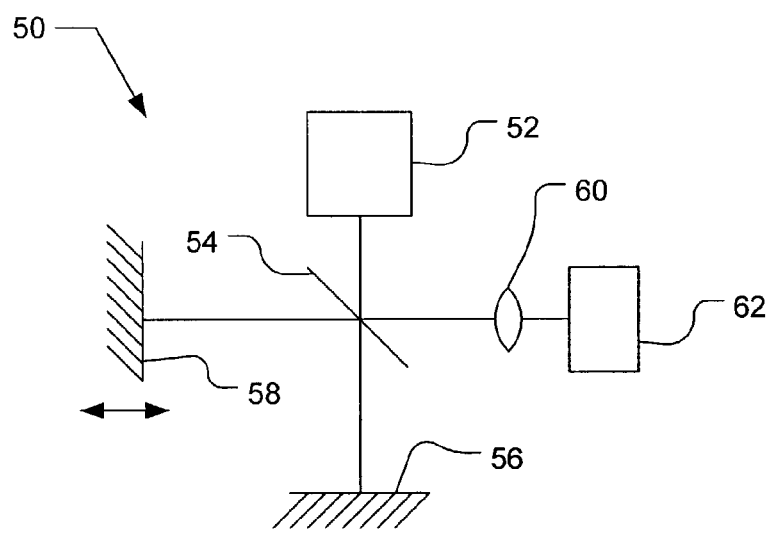
FIG. 2 shows a conventional differential interferometer encoder.
Figure 3:
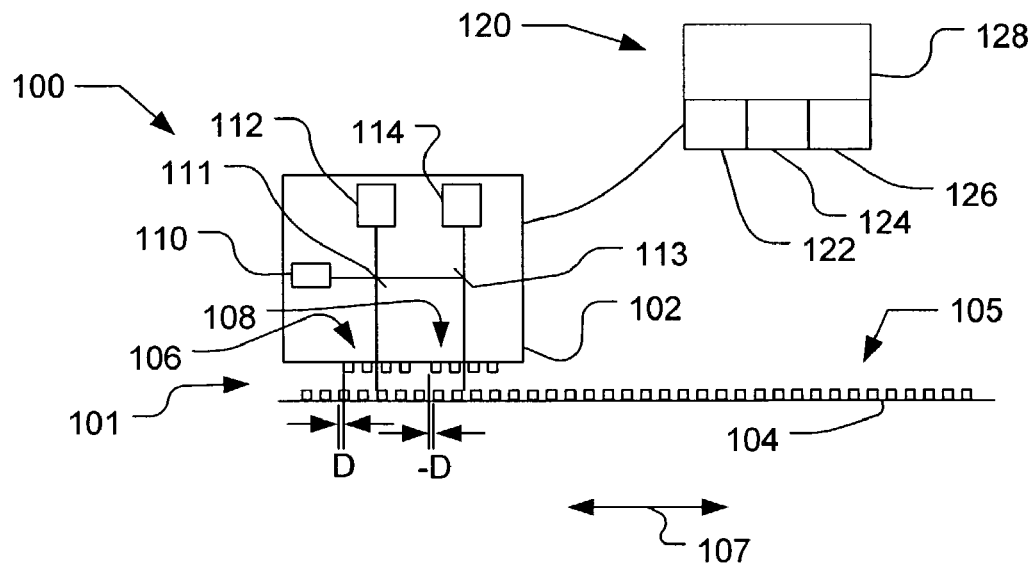
FIG. 3 shows an embodiment of an encoder in accordance with the present invention.

FIG. 3 shows one embodiment of an encoder 100 in accordance with the present invention. Encoder 100 includes a sensor head 102 and a scale 104. The scale 104 includes a continuous periodic pattern 105, such as a diffraction grating. In operation, the sensor head 102 and the scale 104 are movable with respect to each other, as indicated by arrow 107. One of the elements, e.g., the sensor head 102, moves, while the other element, e.g., the scale 104, is held stationary. Encoder 100 may be used as a linear encoder or as a rotary encoder.

As shown in FIG. 3, the sensor head 102 has two measurement locations, each of which includes a periodic pattern 106 and 108. Sensor head 102 also includes a light source 110, which may be, e.g., a white LED source. If desired, an external light source may be used, in which case the light source may be coupled to the sensor head 102, e.g., by a fiber optic cable. Moreover, if desired, more than one light source may be used, e.g., one light source for each measurement location.

Sensor head 102 can operate in reflection mode or transmission mode. FIG. 3 illustrates sensor head 102 operating in reflection mode. As shown, beams splitters 111 and 113 direct the light from light source 110 towards the periodic patterns 106 and 108, respectively. The light passes through periodic patterns 106 and 108, and is reflected back by the periodic pattern 105 on the scale 104. The reflected light passes through beam splitters 111 and 113 and is received by detectors 112 and 114, respectively. Thus, the two measurement locations include both the periodic patterns 106 and 108 on the sensor head 102 and the periodic pattern 105 on the scale 104. Thus, it should be understood that periodic patterns 106 and 105 together will be sometimes referred to as measurement location 106, and likewise, periodic patterns 108 and 105 will be sometimes referred to as measurement location 108.

If desired, multiple light sources may be used in sensor head 102. Moreover, if desired, sensor head 102 may operate in transmission mode. In transmission mode, the light is transmitted through periodic pattern 105 on scale 104, as opposed to being reflected, and is received by detectors on the other side of scale 104.

The detectors 112 and 114 detect the resulting light and convert the light into electrical signals that are received by an evaluation circuit 120 coupled to the sensor head 102.

Figure 4:
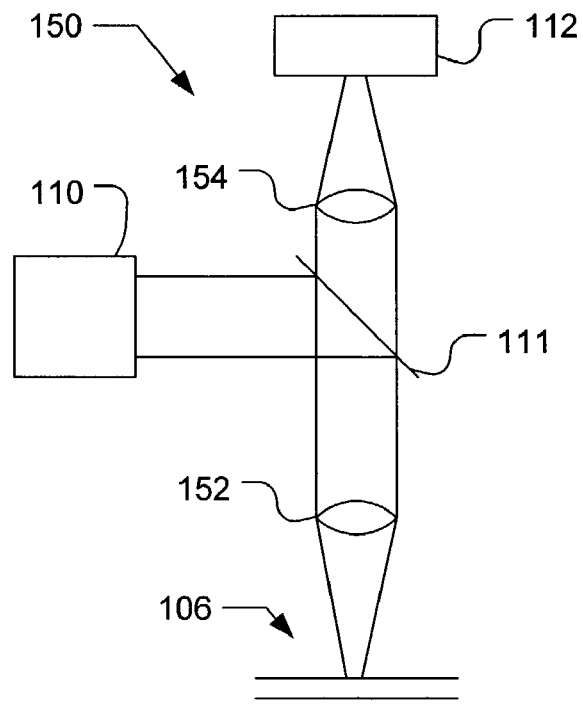
FIG. 4 illustrates a reflectometer that may be used in the encoder in the present invention.

Sensor head 102 may use a reflectometer type device to measure the measurement locations 106 and 108. FIG. 4 illustrates a reflectometer 150 that may be used in the present invention. Reflectometer 150 includes an illumination source 110 that produces radiation that is reflected off beam splitter 111 (or 113). The radiation is focused on the measurement location 106 by lens 152 and interacts with, e.g., is diffracted by, the measurement location 106. After reacting with the measurement location 106, the radiation passes through lens 152 and beam splitter 111 and is focused by another lens 154 onto the detector 112. The operation of reflectometers and similar devices is well known in the art.

Figure 5:
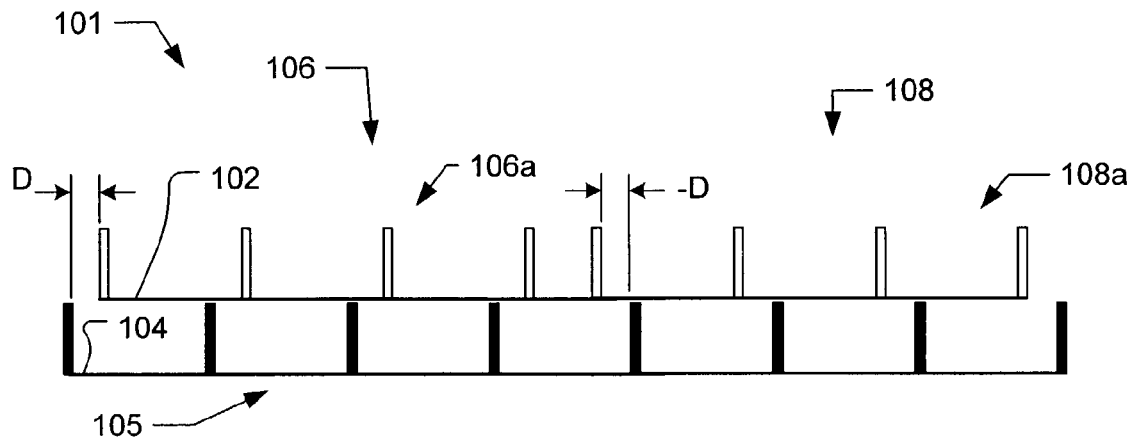
FIGS. 5 and 6 shows a cross-sectional view of the alignment target used with the encoder.

Encoder 100 uses an alignment target, referred to generally in FIG. 3 as alignment target 101, which includes the periodic patterns 106 and 108 on the sensor head and the periodic pattern 105 on the scale. FIG. 5 shows a cross-sectional view of the alignment target 101. The periodic patterns 106 and 108 on the sensor head 102 have different alignment relations with the periodic pattern 105 on the scale 104. The periodic patterns 106 and 108 are defines as being aligned with periodic pattern 105 on scale 104 when there is an offset of +D between the periodic patterns 106 and 105 and an offset of −D between periodic patterns 108 and 105. In other words, the periodic patterns 106 and 108 on sensor head 102 are symmetrically aligned with periodic pattern 105 on scale 104. Because of symmetry, the diffraction patterns produced by periodic patterns 106 and 105 will be the same as the diffraction patterns produced by periodic patterns 108 and 105.

By way of example, the periodic patterns may have a pitch of 400 nm, line widths of 100 nm, and line heights of 200 nm. Of course, the dimensions of the periodic patterns may be altered as desired.

Figure 6:
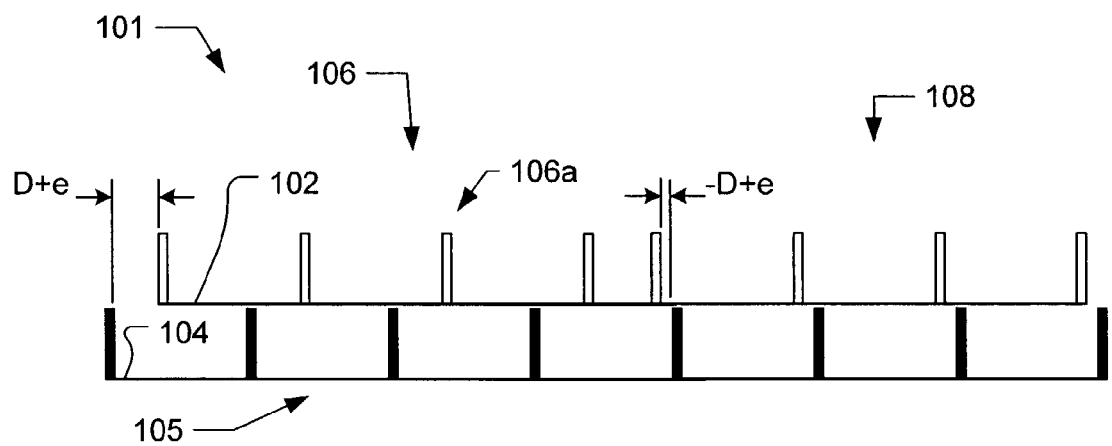

When there is relative movement between the sensor head 102 and the scale 104, however, the offset between the periodic patterns will shift in an asymmetrical manner. As shown in FIG. 6, when sensor head 102 and scale 104 are shifted by an amount e relative to each other, the offset between periodic patterns 106 and 105 will be D+e, while the offset between the periodic patterns 108 and 105 will be −D+e.

Alignment target 101 uses the asymmetrical change in offset to determine when periodic patterns 106 and 108 are in alignment with the periodic pattern 105. By determining the difference between the diffraction patterns generated by measurement location 106 and measurement location 108, it is possible to tell when the periodic patterns 106 and 108 on sensor head 102 are in alignment, as defined above, with the periodic pattern 105 on the scale.

Figure 7:
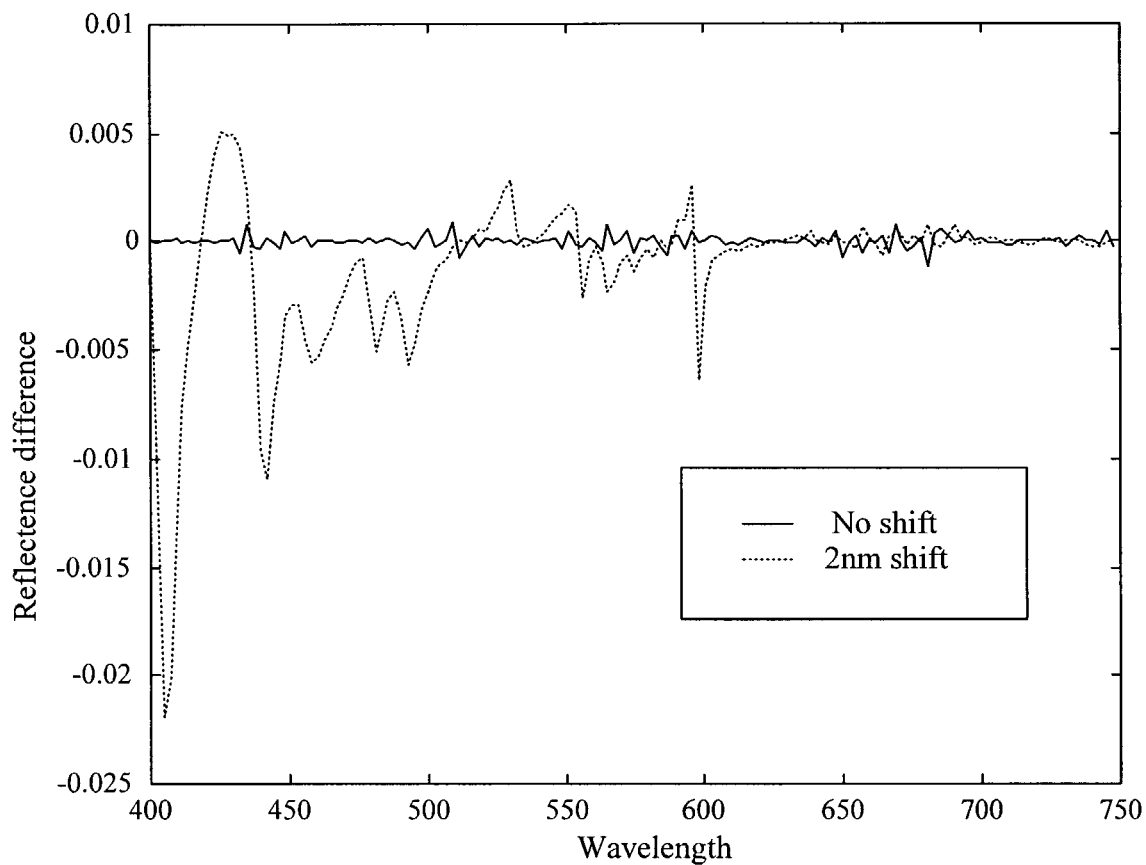
FIG. 7 is a graph showing the difference in the reflectances when there is no shift and when there is a shift of 2 nm.

FIG. 7 is an example of the difference in the reflectances from measurement locations 106 and 108 when there is no shift (shown as the solid line) and when there is a shift of 2 nm (shown as the dotted line). As can be seen in FIG. 7, the difference in spectral reflectance between the measurement locations 106 and 108 when there is no shift is equal to approximately zero (except for a slight amount of noise that can be seen). However, there is a large difference in spectral reflectance between the measurement locations 106 and 108 when there is small shift of 2 nm, particularly within wavelengths 400 to 600 nm. Thus, by calculating the difference between the diffraction at the two measurement locations 106 and 108, small shifts from the defined alignment relationship may be observed.

Referring back to FIGS. 5 and 6, as the shift e from alignment increases, the difference in the spectral reflectance will continue to increase, until the shift e is equal to half the pitch. Because of symmetry, any increase in the shift e beyond half the pitch may be viewed as decreasing the shift e back towards the defined alignment position. Consequently, once the shift e is greater than half the pitch, the difference in the spectral reflectance from measurement locations 106 and 108 will begin to decrease, until the periodic patterns 106 and 108 are in their defined aligned relationship with periodic pattern 105. Once periodic patterns 106 and 108 are in their defined aligned relationship with periodic pattern 105, i.e., no shift, the difference in spectral reflectance will once again be at a minimum.

Figure 8:
FIG. 8 illustrates a periodic pattern that will be formed by the difference in spectral reflectance.

FIG. 8 illustrates a periodic pattern that will be formed by the difference in spectral reflectance from measurement location 106 and 108 as the sensor head 102 is moved relative to the scale 104. A minimum, e.g., zero plus noise, is produced when the periodic patterns 106 and 108 on the sensor head 102 are in the defined aligned relationship with the periodic pattern 105 on scale 104. As the sensor head 102 and scale 104 are moved relative to one another, the difference will increase from the minimum and then will decrease back towards the minimum, thereby creating a series of minima each time the shift e between the periodic patterns becomes zero. By detecting and counting the minima produced and with knowledge of the length of the pitch on the periodic patterns, the position of the sensor head 102 with respect to the scale 104 may be determined.

Figure 9:
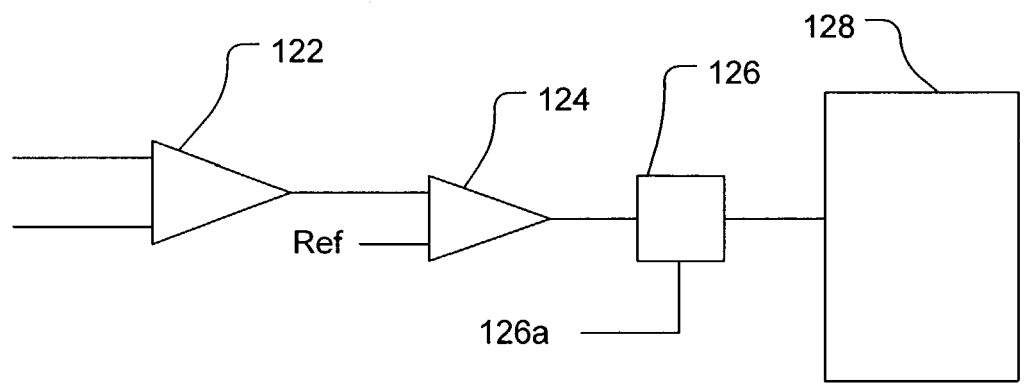
FIG. 9 shows a schematic view of an evaluation circuit used with the present invention.

Referring back to FIG. 3, evaluation circuit 120 includes a comparator circuit 122, a threshold circuit 124 and a counter circuit 126. FIG. 9 shows a schematic view of an evaluation circuit including comparator circuit 122, a threshold circuit 124 and a counter circuit 126. Comparator circuit 122 receives the output signals from detectors 112 and 114 and calculates the difference between the signals. When a plurality of wavelengths are used, the differential spectrum δR may be determined as follows:

$$\delta R = \Sigma_i (R_i 1 - R_i 2)^2. \qquad \text{eq. 1}$$

where R1 is the measurement from location 106 and R2 is the measurement from location 108, and i is the wavelength number in the spectrum.

Once comparator circuit 122 determines the differential spectrum δR, the threshold circuit 124 will compare the differential spectrum δR with a reference Ref value, which ideally would be zero (or ground), but due to noise that may be present in the system, some non-zero value may be used. When the differential spectrum δR is below the threshold Ref, an appropriate signal is sent to the counter circuit 126. If the differential spectrum δR is above the threshold Ref, no signal is sent to counter circuit 126.

When counter circuit 126 receives a signal from threshold circuit 124 indicating that the differential spectrum δR is less than the threshold Ref, counter circuit 126 will increment a count when the sensor head 102 and scale 104 are moving in one direction and decrement the count when the sensor head 102 and scale 104 are moving in the other direction. Counter circuit 126 may receive a signal on line 126a, e.g., from the control system that controls the relative movement, indicating whether to increment or decrement the count. Based on the count from the counter circuit 126, as well as the pitch of the periodic patterns, a processor 128 in evaluation circuit 120 can calculate the position of sensor head 102 with respect to the scale 104.

It should be understood that evaluation circuit 120 may include hardware or software to perform any or all of the evaluation functions. Thus, for example, evaluation circuit 120 may be a processor that includes a computer-usable medium with computer-readable program code embodied therein for causing the processor to produce the differential spectrum δR, to determine when the differential spectrum is at a minimum, and to increment or decrement a count every time the differential spectrum is at a minimum. Alternatively, some of the functions may be performed by software while others are performed by hardware. One of ordinary skill in the art can program code necessary to determine the position of the sensor head 102 with respect to the scale in accordance with the present invention in view of the present disclosure.

By counting the minima, the resolution of the encoder 100 is approximately the pitch of the periodic patterns. The resolution, however, can be increased to sub-nanometer accuracy by recoding the differential spectrum δR as the sensor head 102 and the scale 104 are moved relative to each other through at least one period, i.e., from one minima to the next minima as a reference. During a measurement, the encoder 100 will provide the rough position as the number of minima, and by comparing the measured differential spectrum δR with the stored library of differential spectrum δR, the position of the sensor head 102 relative to the scale may be interpolated.

In another embodiment, a reference technique, similar to that described in U.S. patent application entitled "Alignment Target with Designed in Offset" by Weidong Yang, Roger R. Lowe-Webb, having Ser. No. 10/116,863, which is incorporated herein by reference, may be used to increase the resolution of the encoder 100. For example, a reference technique with three measurement locations may be used. Two of the measurements are provided by measurement locations 106 and 108. By moving the sensor head 102 with respect to the scale 104 by a known amount d, a reference offset is produced and may be measured at, e.g., measurement location 106. The additional reference offset d, is preferably 1 to 15 percent of the pitch of the periodic patterns. The measurement of the reference offset d may be made prior to stopping the relative motion of the scale 104 and sensor head 102, or the measurement may be made by moving the one of the sensor head 102 or scale 104, measuring the reference offset d, and moving the sensor head 102 or scale 104 back into position. Once the reference measurement is made, the precise position between the sensor head 102 and the scale 104 may be determined as follows:

$$e = \frac{R1-R2}{R3-R1} \cdot \frac{d}{2} \qquad \text{eq. 2}$$

where e is the amount of shift from alignment, R1 is the measurement from location 106 and R2 is the measurement from location 108, R3 is the reference measurement (i.e., location 106 moved by an amount d) and d is the amount of the reference offset. It should be understood that e can be calculated using an optimization process as described in U.S. patent application entitled "Alignment Target with Designed in Offset", which is incorporated herein by reference.

Moreover, if desired, additional reference measurements may be made, as described in U.S. patent application entitled "Alignment Target with Designed in Offset", which is incorporated herein by reference.

It should be understood that if desired only one measurement locations, e.g., location 106 may be used. A first measurement is made and the sensor head 102 and scale 104 are moved by a known amount D. A second measurement at location 106 is then made. In this manner, two measurements are made using only a single measurement location. The two measurements can then be compared to each other to determine the position of the sensor head 102 with respect to the scale 104.

Moreover, it should be understood that the alignment target 101 on the encoder 100 may be used to provide only a fine resolution of the encoder. Thus, there is no need to count the minima. For example, a conventional encoder may be used to produce a course position, while the encoder 100 with alignment target 101 may be used to produce the fine position as described above.

If desired, the encoder may include a sensor head with additional measurement locations. FIG. 10 shows an encoder 200 that is similar to the encoder 100 shown in FIG. 3, like designated elements being the same, except that three measurement locations 106, 108 and 209 are used in sensor head 202. If desired, more than three measurement locations may be used. As shown in FIG. 10, sensor head 202 has an additional beam splitter 210 and detector 212 used in conjunction with the additional measurement location 209. As illustrated in FIG. 10, the measurement locations 106, 108 and 209 have three different offsets D1, D2 and D3 between the periodic patterns on the sensor head 202 and the periodic pattern 105 on the scale 104.

FIGS. 11A, 11B, and 11C illustrate schematically the operation of encoder 200. Periodic patterns 106, 108, and 209 are shown overlapping for the sake of reference. As shown in FIG. 11A, when periodic patterns 106 and 108 are offset from periodic pattern 105 by the same amount, the difference in the spectra produced by measurement locations 106 and 108, i.e., the differential spectra $\delta R_{106\text{-}108}$, will be a minimum. As the sensor head 202 moves relative to the scale 104, the differential spectra $\delta R_{106\text{-}108}$ will vary periodically, as illustrated in FIG. 12.

Similarly, as shown in FIG. 11B, when periodic patterns 108 and 209 are offset from periodic pattern 105 by the same amount, the differential spectra $\delta R_{108\text{-}209}$ produced by measurement locations 108 and 209 will be at a minimum. Again, the differential spectra $\delta R_{108\text{-}209}$ will vary periodically, as shown in FIG. 12, as the sensor head 202 and the scale 104, move relative to each other. Similarly, as shown in FIG. 11C, when periodic patterns 106 and 209 are offset from periodic pattern 105 by the same amount, the differential spectra $\delta R_{106\text{-}209}$ produced by measurement locations 106 and 209 will be at a minimum, and the differential spectra $\delta R_{106\text{-}209}$ will vary, as illustrated in FIG. 12, as the position of the sensor head 202 relative to the scale 104 varies.

Thus, as can be seen in FIG. 12, by using three measurement locations, the number of minima is increased, which increases the resolution of the encoder 200. In addition, the use of more than two measurement locations is desirable, because the differential spectra $\delta R$ from two locations does not vary linearly over the entire period, i.e., from one minima to the next minima. The differential spectra $\delta R$ is highly linear in a range of approximately ±25 percent from the defined alignment point. Thus, by using at least three measurement locations, two of the measurement locations are always within the linear range.

In addition, directional information for the encoder may be determined using a plurality of measurement locations, e.g., the three measurement locations shown in FIGS. 10, 11A, 11B, and 11C. When a detector receives a minima it is possible to determine the direction of travel of the sensor head 202 relative to the scale 104, by looking at the state of the system, i.e., which detector received a minima last. For example, when moving the sensor head 202 to the right as defined in FIGS. 10 and 12, the differential spectra signals produce a minima as follows $\delta R_{106\text{-}108}$ then $\delta R_{108\text{-}209}$ then $\delta R_{106\text{-}209}$, etc . . . . When the sensor head 202 moves to the left, however, the differential spectra signals produce minima in the opposite directions, i.e., $\delta R_{106\text{-}209}$, then $\delta R_{108\text{-}209}$ then $\delta R_{106\text{-}108}$. Accordingly, by determining the order that minima are produced by the differential spectra signals, the direction of travel of the sensor head 202 relative to the scale may advantageously be determined.

In addition, with the use three or more measurement locations, a reference measurement may be made as discussed above in reference to equation 2.

Figure 13:
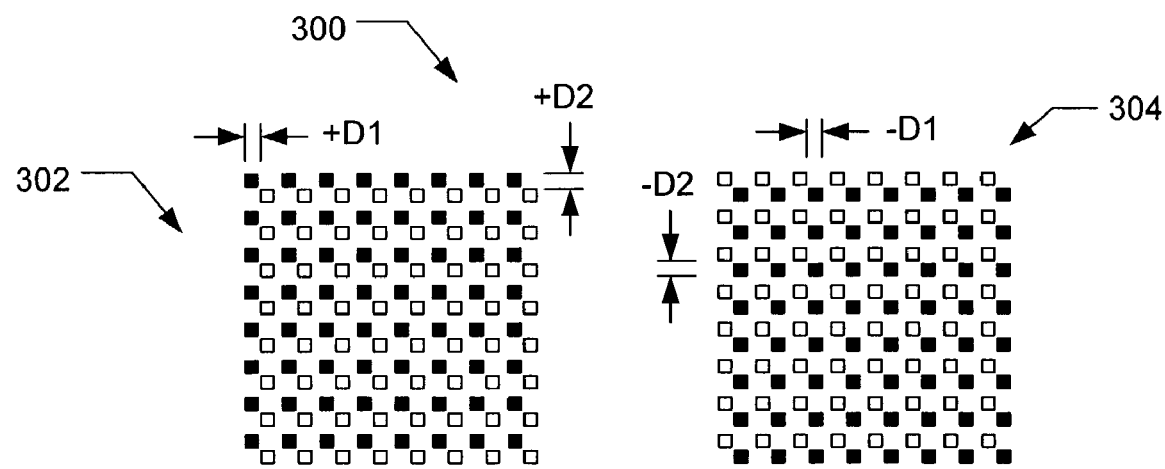
FIG. 13 shows a top view of an alignment target that may be used with the encoder.

If desired, the alignment target 101 used with the encoder may have periodicities in two directions. FIG. 13 shows a top view of an alignment target 300, which may be used in an encoder, in accordance with the present invention. As shown in FIG. 13, alignment target 300 includes two measurement locations 302 and 304 that are composed of a series of squares that extend in two directions. The solid squares in FIG. 13 are, e.g., the periodic pattern on the scale 104, while the empty squares are the periodic patterns on the sensor head 102. Similar to alignment target 101, alignment target 300 includes an offset of ±D1 in the X direction when the periodic patterns are defined as aligned in the X direction, and an offset of ±D2 in the Y direction when the periodic patterns are defined as aligned in the Y direction. The magnitude of offsets D1 and D2 may be the same or different. If desired, the alignment target 300 may be formed using other shapes besides squares, e.g., circles or polygons, as long as it has periods in two directions. In operation, a sensor head may use two incident beams, e.g., non-normal beams, for each measurement location 302 and 304, e.g., on in the X direction and one in the Y direction.

It should be understood that if desired, either the periodic patterns on the scale 104 or the periodic patterns on the sensor head 102 may have periodicities in two directions.

In accordance with another embodiment of the present invention, sensor head 102 uses only one measurement location, e.g., location 106, and takes two measurements at location 106 with different polarization states, as discussed in more detail in U.S. patent application entitled "Measuring An Alignment Target With Multiple Polarization States" by Weidong Yang, Roger R. Lowe-Webb, which is incorporated herein by reference.

FIGS. 14A and 14B show a top view and side view, respectively, of an alignment target 400 with which multiple polarization states are used. A light source 420 produces a light beam 421 that is incident on the periodic patterns 404 on the sensor head 102 and periodic pattern 105 on scale 104. Light source 420 produces light that has a non-normal angle of incidence and has an azimuthal angle that is non-parallel with the direction of periodicity of the periodic patterns in alignment target 400, if the pattern has only one periodicity direction. With alignment target 400, the periodic patterns 404 and 105 are defined as aligned when there is no offset between the two.

The light source 420 produces a light beam 421 that has a single polarization state. After the light interacts with alignment target 400, a detector 422 detects the resulting polarization states. Alternatively, light source 420 may produce two light beams, each with a different polarization state. The detector 422 can detect the resulting polarization states or if desired detect the same polarization state for the two different light beams.

The difference in intensity of the polarization states from alignment target 400 varies proportionally with the alignment error. When the periodic patterns 404 and 105 are in the defined aligned relationship, the polarization states in the detected radiation will have equal intensity. Thus, the difference between the detected polarization states will be a minimum. However, when there is a shift between periodic patterns 404 and 105, as illustrated in FIG. 15, the intensity of the detected polarization states will be unequal. Thus, difference in the polarization states will increase to a maximum at which time it will decrease back to the minimum, i.e., when the periodic patterns 404 and 105 are back in the defined aligned relationship.

Thus, with alignment target 400, the minima in the difference between the detected polarization states may be counted to determine the position of the sensor head with respect to the scale. Moreover, as describe above, the accuracy of the encoder may be further increased by using a reference measurement or using a library of the differences in polarization states with respect to a period, i.e., from minimum to minimum, to interpolate the position.

For more discussion on the use of multiple polarization states and its possible uses with an encoder, the reader is referred to U.S. patent application entitled "Measuring An Alignment Target With Multiple Polarization States" by Weidong Yang, Roger R. Lowe-Webb, which is incorporated herein by reference.

Figure 16:
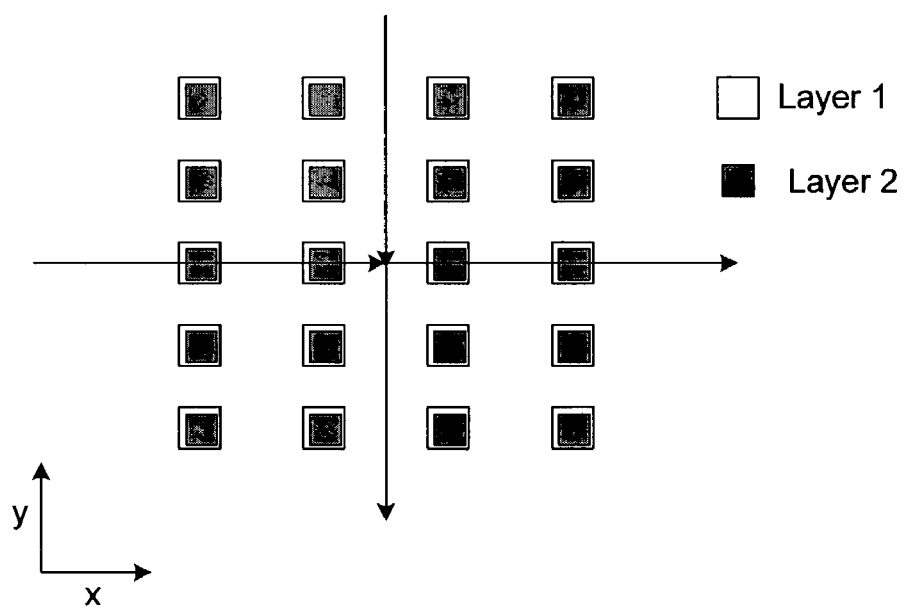
FIG. 16 shows a top view of an alignment target that may be used with the encoder.

With the use of multiple polarization states, an alignment target having only one location with a periodic pattern with periodicities in two directions may be used to measure the position of the sensor head with respect to the scale in both the X and Y direction, as illustrated in FIG. 16.

In another embodiment, moiré fringe patterns may be used in an encoder. FIG. 17 shows an embodiment of the alignment target 500 that may be used with, e.g., encoder 100 in FIG. 3. Alignment target 500 includes two measurement locations, which includes periodic patterns 506 and 508 on the sensor head 502 and the periodic pattern 505 on scale 504. The periodic pattern 505 on scale 504 has a P1, while the periodic pattern 506 has a pitch P2, which is larger than pitch P1 by an amount δ, and the periodic pattern 508 has a pitch P3 that is smaller than the pitch P1 by an amount δ.

When imaged, measurement locations 506 and 508 will produce moiré fringe patterns, similar to that shown in FIG. 18A, wherein pattern 506' is produced by location 506 and pattern 508' is produced by location 508. As the sensor head 502 and the scale 504 are moved relative to each other, the bands in the moiré fringe patterns 506' and 508' will move in opposite directions, as indicated by the arrows in FIG. 18B. By detecting when the bands in the moiré fringe patterns 506' and 508' coincide, it is possible to determine when the periodic patterns 506 and 508 are in a defined aligned relationship with periodic pattern 505. Thus, by counting every time the bands in the moiré fringe patterns 506' and 508' coincide, the relative position of the sensor head 502 and scale 504 can be determined. Moreover, as discussed above, by using referencing techniques, e.g., by recording a series of positions of the bands over one period, i.e., from the defined aligned relationship to the next defined aligned relationship, the position of the sensor head 502 with respect to the scale 504 may be interpolated.

For more discussion on the use of moiré fringe patterns their possible uses with an encoder, the reader is referred to U.S. patent application entitled "Alignment Target with Designed in Offset" by Weidong Yang, Roger R. Lowe-Webb, John D. Heaton, and Guoguang Li; and U.S. patent application Entitled "Positioning Two Elements Using An Alignment Target with a Designed in Offset" by Weidong Yang, Roger R. Lowe-Webb, both of which are incorporated herein by reference.

Figure 19:
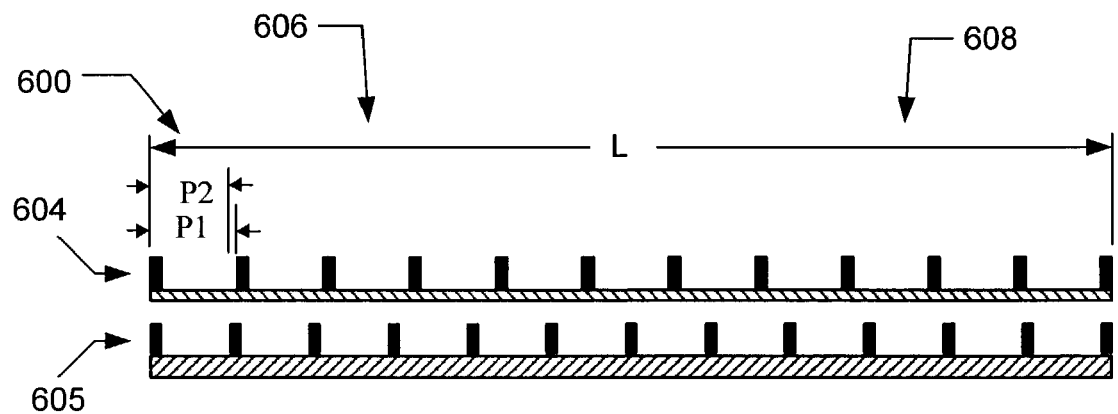
FIG. 19 shows an embodiment of an alignment target that may be used with the encoder.

Moreover, it should be understood that alignment target 101 may be composed of a single periodic pattern on the sensor head and a periodic pattern on the scale as shown in FIG. 19. Alignment target 600 in FIG. 19, includes a periodic pattern 604 on the sensor head that has a pitch P1 and a periodic pattern 605 on the scale that has a pitch P2, which is different than pitch P1. When alignment target 600 has a linear dimension L, such that all phases between 0 and 360 degrees is included, there will be two locations, shown generally as 606 and 608 that are equal and opposite offsets between the periodic patterns 604 and 605.

Figure 20:
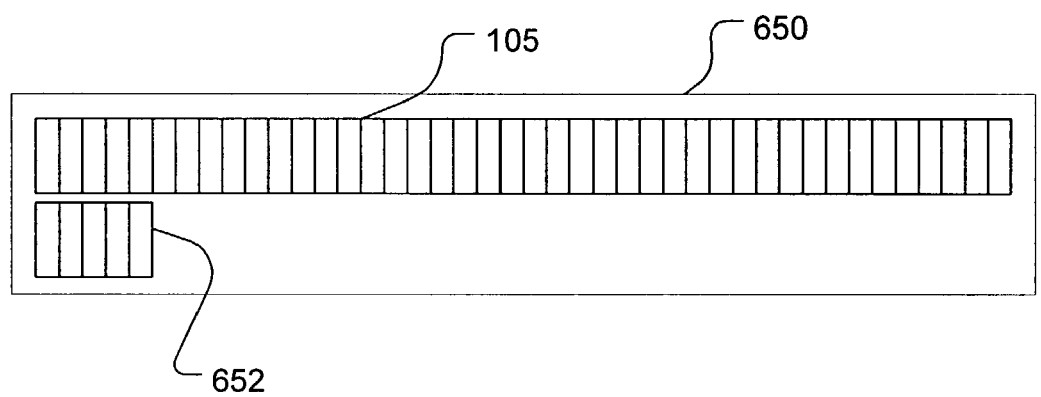
FIG. 20 shows a top view of a scale that may include a periodic index pattern near the periodic pattern.

It should be understood that a conventional indexing system may be used with the encoder of the present invention. For example, a single point index may be included on the scale 104 beside or on top of periodic pattern 105. The index mark may be used in a routine on initial start up that defines the index point as the zero point of the scale 104. Thus, the encoder zero point on the scale 104 can be repeatably located even after a power cycle. Indexing system and procedures are well known to those skilled in the art. If desired, a conventional indexing system may be used. Alternatively, a separate periodic index pattern on the scale near the periodic pattern 105 may be used. FIG. 20 shows a top view of a scale 650 that may include a periodic index pattern 652 near the periodic pattern 105. A separate detector in the sensor head may be used to detect the periodic pattern 652, as discussed above, and determine the location of the minima, which serves as the index point for scale 650. Accordingly, the index pattern 652 will provide a very accurate index point.

Figure 21:
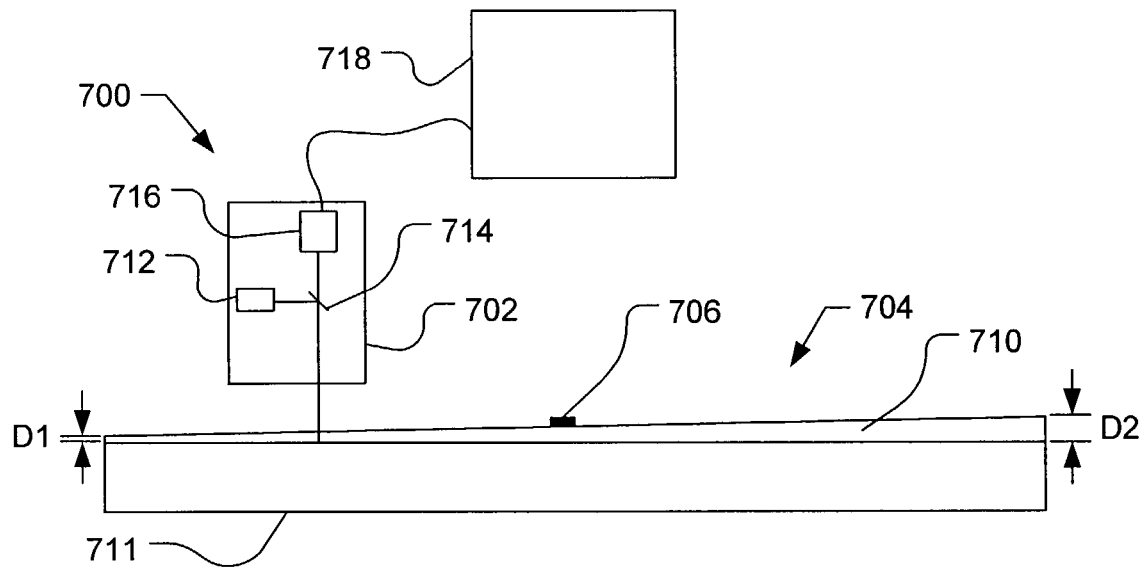
FIG. 21 shows a side view of an encoder, in accordance with an embodiment of the present invention, which uses a layer of varying thickness on the scale to determine the position of the sensor head relative to the scale.

As discussed above, an encoder, in accordance with an embodiment of the present invention, may use the alignment target to provide the fine resolution of the encoder. For example, an encoder may use a periodic pattern 105 to provide the fine resolution along with another metric that provides the coarse resolution. FIG. 21 shows a side view of an encoder 700, in accordance with an embodiment of the present invention, which uses a layer 710 of varying thickness on the scale 704 to determine the position of the sensor head 702 relative to the scale 704. As illustrated in FIG. 21, layer 710 overlies substrate 711 and has a thickness of D1 at one end and a different thickness D2 at the other end. The film thickness is increasing or decreasing in a given direction. For example, layer 710 may vary in thickness from 20 Å to 20µ, with a rate of change of the thickness being, e.g., 2 Å/µ. Thus, the length of the scale 704 may be approximately 100 mm. It should be understood, however, that any range of thicknesses and alternative rates of change may be used. Thus, with the use of a reflectometer with an accuracy of 2 Å, an encoder, in accordance with the present invention, with a rate of change of 2 Å/µ will have an accuracy of approximately 1µ.

The scale 704 may be fabricated as a single substrate that varies in thickness, or as a substrate covered by one or more layers, where one or more of the layers vary in thickness or alternatively the substrate varies in thickness. The variation in thickness in the scale may be linear or may be incremental, i.e., using small steps across the scale 704. Producing a layer of varying thickness is well within the abilities of those skilled in the art.

For example, to produce the scale 704, with a varying thickness substrate, the substrate, which may be quartz or sapphire, may be polished, e.g., using chemical mechanical polishing (CMP), to produce the desired variation in thickness. The substrate may then be covered with transparent film if desired. Depending on the thickness of the resulting substrate, the substrate may need to be supported.

If a layer 710 of varying thickness is to be produced on a substrate, the layer may be produced in several ways. For example, the layer 710 may be polished, e.g., using CMP, to produce the desired variation in thickness. Alternatively, the layer 710 may be produced in a LPCVD process with a temperature gradient within the chamber or restricted gas flow, with a tilted substrate, or with a two facing substrates that are touching on only one side. In another embodiment, thermal oxidation with a temperature gradient within the chamber may be used to produce layer 710. In another embodiment, the composition of the film may be varied, to vary the index of refraction as opposed to the thickness of the film. In such an embodiment, the film is produced on the substrate using a ratio of gases that varies across the length of the substrate. For example, an oxide, silicon nitride, or titanium oxide may be produced that varies in composition by varying the ratio of gases that are used to grow the film. With a varying composition, the variation of the index of refraction is measured as opposed to the thickness of the film.

In another embodiment, the layer 710 may be sputtered, CVD or otherwise deposited, onto a substrate 711 while the substrate 711 is moved laterally out of the sputter or deposition area. Consequently, the thickness of layer 710 will be greater in areas that remain in the sputter or deposition area. The rate of change in thickness of layer 710 may be controlled by the rate that the substrate 711 is moved laterally out of the sputter or deposition area.

In another embodiment, the substrate, or the overlying film, e.g., film 710, may be etched to produce a series of steps. Multiple mask and etch process may be used to produce the series of steps or alternatively, one or more gray scale masks may be used.

The sensor head 702 includes a reflectometer arrangement with a light source 712, beam splitter 714, and detector 716. The detector 716 provides a signal to a processor 718 that determines the thickness of layer 710. Based on the light received at detector 716, along with know optical characteristics of the materials in layers 710 and 712, i.e., index of refraction and extinction coefficient, processor 718 can calculate the depth of layer 710 using conventional and well known reflectometry calculations based on Fresnel equations. Measuring the thickness of a layer is well understood in the art.

A calibration procedure may be performed prior to using encoder 700, e.g., measuring the thickness of layer 710 across the known length of the scale 704. The calibration may be done on a reference system of known accuracy. Thus, for example, a stage with a laser interferometer encoder may be used to accurately determine the position of the calibration measurements. An index mark 706, e.g., an opaque mark on layer 710, may be used as a point of reference. The calibration measurement may be made at two locations on the scale 704, e.g., at the ends, and the thickness of layer 710 calculated based on the assumption that the thickness changes linearly. Alternatively, the calibration measurement may be made at many locations across the scale 704. From the calibration procedure the rate of change of the thickness of layer 710 may be determined or a map of the thickness of the layer 710 relative to the position of the sensor head 712 may be made. During operation, the thickness measurement made by sensor head 702 can be converted quickly to distance as follows:

$$D = (T_1 - T_D) \times T_{RC} \qquad \text{eq. 3}$$

where $T_1$ is the thickness at a reference location, i.e., an index mark, $T_D$ is the thickness at the current measurement location, $T_{RC}$ is the rate of change of the thickness, and D is the distance between the current measurement location from the reference location. In another embodiment, a table of two or more calibration measurements may be used to convert a thickness measurement into the position of the sensor head 102 with respect to the scale 704. The table may include a linear interpolation of data points between the calibration measurements.

Figure 22:
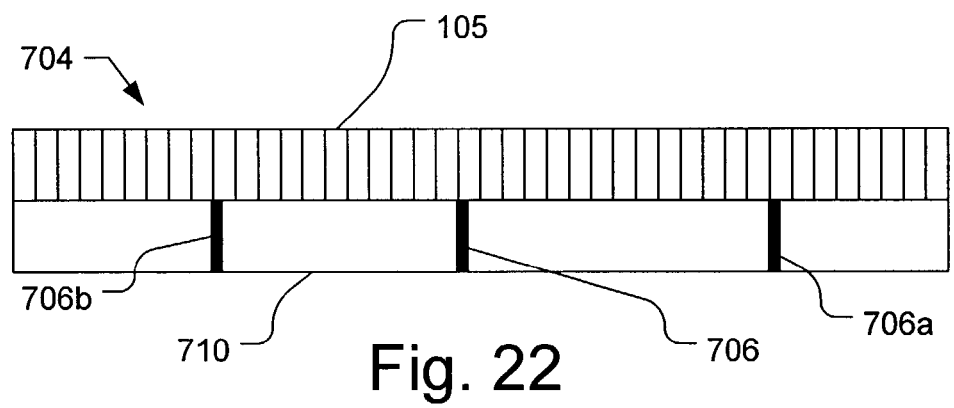
FIG. 22 shows a top view of the scale shown in FIG. 21 including layer along with a periodic pattern shown, e.g., in FIG. 3.
Figure 23:
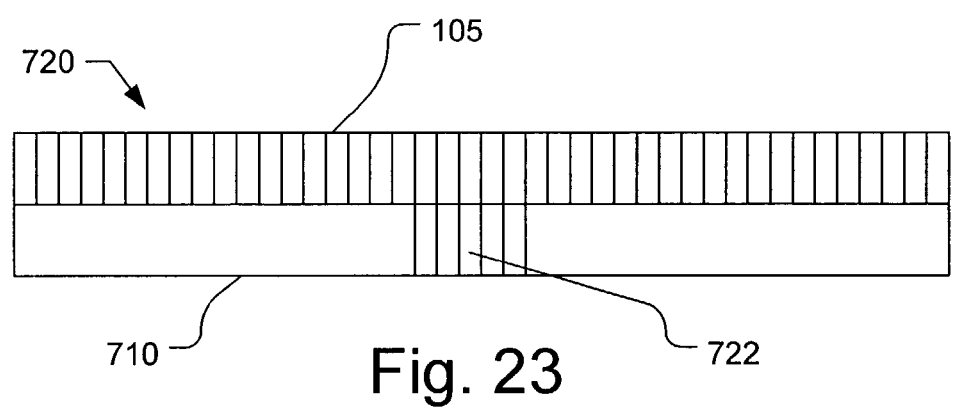
FIG. 23 shows a top view of the scale shown in FIG. 21 including layer along with a periodic pattern shown, e.g., in FIG. 3, where scale includes periodic pattern index marks.

In one embodiment, encoder 700 may be used without the periodic pattern 105 shown in FIG. 3. Thus, the position of the sensor head 702 with respect to the scale 704 is determined based on the thickness of the layer 710. If the resolution of the measurement of film thickness of layer 710 is adequate, encoder 700 may serve as an adequately precise encoder. In another embodiment, the encoder 700 uses the thickness measurement of layer 710 in conjunction with the alignment patterns described above. FIG. 22, for example, shows a top view of scale 704 including layer 710 along with the periodic pattern 105. In this embodiment, sensor head 702 is connected or part of sensor head 102 (shown in FIG. 3) or sensor head 202 (shown in FIG. 10). Moreover, processor 718 may be part of or the same as processor 128 (shown in FIGS. 3 and 10). FIG. 23 shows another embodiment, where the scale 720 includes a periodic pattern 722 as the index mark. The periodic pattern 722 may be used as described above to precisely determine the reference location of the index mark.

Where layer 710 is used in conjunction with periodic pattern 105, the encoder will be able to quickly determine its position on start up using the varying thickness layer 710. With knowledge of the system position, the system can drive directly to the index mark 706 and go into high resolution mode. Consequently, the index mark can be quickly and accurately located, which advantageously avoids performing a conventional blind search for the index mark. Moreover, multiple index marks 706, 706a, and 706b may be used so the stage only needs to be moved to the nearest index mark to initialize the encoder.

In addition, with layer 710 used in conjunction with periodic pattern 105, the layer 710 may be used to provide a coarse positioning resolution of the system and the periodic pattern 105 may be used to provide a fine positioning resolution. In such an embodiment, the positioning resolution of the thickness measuring portion of the encoder 700 should be better than the spacing between repeating minima from the alignment target portion of the encoder, e.g., the minima provided by the differential spectra signals $\delta R_{106\text{-}108}$, $\delta R_{108\text{-}209}$, and $\delta R_{106\text{-}209}$ as shown in FIG. 12. If only two periodic patterns 106 and 108 are used on the sensor head (as shown in FIG. 3), the positioning resolution of the thickness measuring portion of the encoder 700 should be better than the pitch of the periodic patterns. Advantageously, with the use of layer 710 to provide a coarse position and the periodic patterns are used to provide the fine resolution, there is no need to count the minima of the differential spectral signals.

Figure 24:
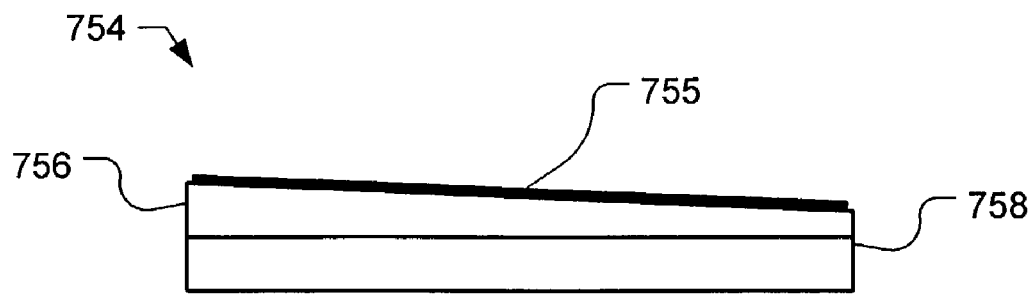
FIGS. 24 and 25 show side and top views, respectively, of a rotary scale that may be used with the present invention.
Figure 25:
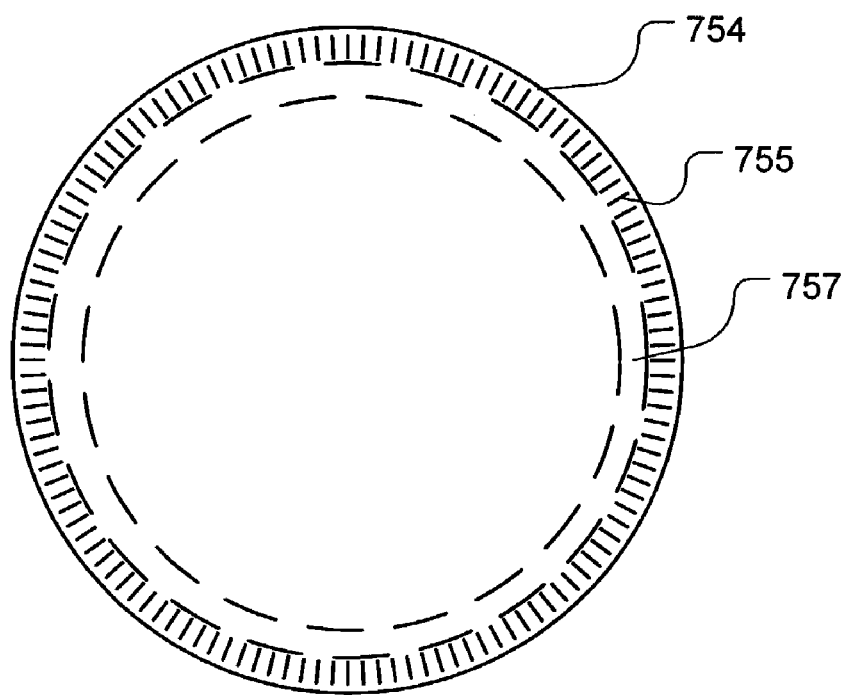

It should be understood the present invention may be used in a linear encoder or a rotary encoder. FIGS. 24 and 25 show side and top views of a rotary scale 754 that may be used with the present invention. As shown in FIG. 24, rotary scale 754 includes a layer 756 disposed over a substrate 758 that has a varying thickness. As shown in FIG. 25, rotary scale 754 includes a periodic pattern 755 and a track 757 (indicated by broken lines) that is used to measure the thickness of the layer 756.

Although the invention has been described with reference to particular embodiments, the description is only an example of the invention's application and should not be taken as a limitation. Various adaptations and modifications may be made without departing from the scope of the invention. For example, the index of refraction may be used to determine position as opposed to thickness. Moreover, the substrate or a film on the substrate may be used as the layer of varying thickness or index of refraction. Moreover, additional or different optical components and focal systems may be used. Therefore, the spirit and scope of the appended claims should not be limited to the foregoing description.

What is claimed is:

1. A method of determining the position of a first element with respect to a second element along a direction of motion, where the second element has a layer that varies in one of thickness and index of refraction along said direction of motion, said method comprising:
measuring one of the thickness and index of refraction of said layer with a sensor on said first element; and
converting the measurement of said layer to the position of said first element with respect to said second element.

2. The method of claim 1, wherein measuring one of the thickness and index of refraction of said layer comprises:
illuminating said layer with incident radiation;
detecting the radiation from said layer; and
calculating one of said thickness and said index of refraction of said layer based on the detected radiation from said layer.

3. The method of claim 1, further comprising:
determining one of the thickness and index of refraction of said layer at least at two locations; and
using the determined one of the thickness and index of refraction thickness at said at least two locations to convert the measurement to the position of said first element with respect to said second element.

4. The method of claim 1, further comprising:
determining the rate of change of one of the thickness and index of refraction thickness of said layer; and
using said rate of change of said layer to convert the measurement to the position of said first element with respect to said second element.

5. The method of claim 1, wherein an alignment target is on said first element and said second element, the alignment target having at least one periodic pattern on said first element and at least one periodic pattern on said second element, said method further comprising:
moving at least one of said first element and said second element with respect to the other;
illuminating said alignment target with incident radiation;
detecting the radiation from said alignment target after interacting with said periodic pattern on said first element and said periodic pattern on said second element; and
using said detected radiation from said alignment target to determine the position of said first element with respect to said second element.

6. The method of claim 5, wherein converting the measurement of said layer provides a rough position of said first element with respect to said second element and using said detected radiation from said alignment target provides a fine position of said first element with respect to said second element.

7. The method of claim 5, wherein:
said alignment target, when aligned, has a first location with the periodic pattern on the first element offset from the periodic pattern on the second element by a first amount and having a second location with the periodic pattern on the first element offset from the periodic pattern on the second element by a second amount;
said illuminating said alignment target is illuminating said first and second locations on said alignment target;
said detecting the radiation is detecting from said first and second locations after interacting with said alignment target; and wherein
using said detected radiation is comparing the detected radiation from said first and second locations to determine when the alignment target is aligned.

8. The method of claim 7, wherein said comparing the detected radiation includes calculating the difference between the detected radiation from a first location and the detected radiation from a second location.

9. The method of claim 7, wherein said alignment target includes a third location with the periodic pattern on the first element offset from the periodic pattern on the second element by a third amount.

10. The method of claim 5, wherein said periodic patterns are diffraction gratings.

11. The method of claim 5, wherein said layer and said alignment target are illuminated with radiation at the same time.

12. The method of claim 1, wherein said first element is a sensor head and said second element is a scale.

13. An apparatus for determining the position of a sensor head with respect to a scale, said apparatus comprising:
   a layer on said scale extending in a first direction, said layer having one of a thickness and index of refraction that varies as a function of position in said first direction;
   at least one light source for producing light to be incident on said layer;
   a light detector for detecting light that interacts with said layer; and
   a processor coupled to said light detector, said processor having a computer-usable medium having computer-readable program code embodied therein for causing said processor to calculate one of the thickness and index of refraction of said layer based on the light detected by said light detector, said computer-readable program code embodied therein causing said processor to convert one of the thickness and index of refraction to a position in said first direction.

14. The apparatus of claim 13, wherein said light source and said light detector are located within said sensor head.

15. The apparatus of claim 13, further comprising an alignment target on said sensor head and said scale, the alignment target having at least one periodic pattern on said sensor head and at least one periodic pattern on said scale.

16. The apparatus of claim 15, wherein said alignment target has a first location with the periodic pattern on the sensor head offset from the periodic pattern on the scale by a first amount and having a second location with the periodic pattern on said sensor head offset from the periodic pattern on said scale by a second amount, said apparatus further comprising:
   at least one light source for producing light to be incident on said first location and said second location of said alignment target;
   a first light detector for detecting light that interacts with said first location;
   a second light detector for detecting light that interacts with said second location;
   a comparator to calculate the difference between the detected light from said first and second locations, wherein said comparator produces an output signal that has a minimum when said periodic pattern on said sensor head and said periodic pattern on said scale are aligned.

17. The apparatus of claim 16, wherein said at least one light source for producing light to be incident on said first location and said second location of said alignment target and said at least one light source for producing light to be incident on said layer are the same at least one light source.

18. The apparatus of claim 15, wherein said periodic patterns are diffraction gratings.

19. The apparatus of claim 15, further comprising:
   at least one light source for producing light to be incident on said alignment target, said light have a plurality of polarization states;
   a light detector for detecting the intensities of the polarization states after the light interacts with said alignment target;
   a comparator to calculate the difference between the intensities of said polarization states.

20. A method of determining the position of a first element with respect to a second element along a direction of motion, said method comprising:
   providing a layer on said second element, said layer varying in one of thickness and index of refraction along said direction of motion;
   providing an alignment target on said first element and said second element, said alignment target having at least one periodic pattern on said first element and at least one periodic pattern on said second element;
   measuring one of the thickness and index of refraction of said layer with a sensor on said first element;
   converting the measurement to the position of said first element with respect to said second element to obtain an estimated position of said first element with respect to said second element;
   illuminating said alignment target with incident radiation;
   detecting the radiation from said alignment target after interacting with said periodic pattern on said first element and said periodic pattern on said second element; and
   using said detected radiation from said alignment target to determine a refined position of said first element with respect to said second element.

21. The method of claim 20, wherein measuring one of the thickness and index of refraction of said layer comprises:
   illuminating said layer with incident radiation;
   detecting the radiation that interacts with said layer; and
   calculating one of the thickness and index of refraction of said layer based on the detected radiation from said layer.

22. The method of claim 20, further comprising:
   using said estimated position to locate an index point having a known position between said first element and said second element; and
   using said refined position to locate the position of said first element with respect to said second element referenced to said index point.

* * * * *